United States Patent [19]

Nishioki et al.

[11] Patent Number: 5,035,507
[45] Date of Patent: Jul. 30, 1991

[54] GRATING-INTERFERENCE TYPE DISPLACEMENT METER APPARATUS

[75] Inventors: Nobuhisa Nishioki; Tatsuo Itabashi, both of Kawasaki, Japan

[73] Assignee: Mitutoyo Corporation, Japan

[21] Appl. No.: 448,954

[22] Filed: Dec. 12, 1989

[30] Foreign Application Priority Data

Dec. 21, 1988 [JP] Japan .................................. 63-322587
Dec. 21, 1988 [JP] Japan .................................. 63-322588

[51] Int. Cl.⁵ .............................................. G01B 9/02
[52] U.S. Cl. .................................................... 356/356
[58] Field of Search .......................................... 356/356

[56] References Cited

U.S. PATENT DOCUMENTS 4,629,886 12/1986 Akiyama et al. .
4,676,645 6/1987 Taniguchi et al. .................. 356/356
4,930,895 6/1990 Nishimura et al. ................. 356/356
4,979,826 12/1990 Ishizuka et al. ..................... 356/356

FOREIGN PATENT DOCUMENTS 1306632 2/1973 United Kingdom .

Primary Examiner—Davis L. Willis
Assistant Examiner—Matthew W. Koren
Attorney, Agent, or Firm—Oliff & Berridge

[57] ABSTRACT

A grating-interference type displacement meter apparatus is disclosed wherein a convex lens or a concave mirror is disposed such that a focal point thereof is placed on a refraction plane or a diffraction plane of a diffraction grating, or wherein zeroth-order beams transmitted through the diffraction grating are reflected back in the same direction by a rectangular prism or a triangular prism for reentrance thereof onto the diffraction grating. Hereby, a plurality of optical beams produced by the diffraction grating are directed to propagate parallely to directions of propagation thereof defined in its design.

10 Claims, 7 Drawing Sheets

GRATING-INTERFERENCE TYPE DISPLACEMENT METER APPARATUS

BACKGROUND OF THE INVENTION

1. Field of the Invention

The present invention relates to a grating-interference type displacement meter, and more specifically to that capable of assuring stable interference even when a scale has a uneven surface.

2. Description of the Prior Art

A photoelectric encoder is well known heretofore, which includes a scale on which optical graduations are formed with a given pitch to generate a periodic detection signal. The photoelectric encoder has its resolution defined by the width of a groove of an optical grating and a pitch which is a distance between adjacent grooves of the grating, and defined by characteristics of an electronic-circuit for processing a signal after photoelectric conversion. Such an optical grating is generally formed by etching and hence has the atmost resolution of approximately 4 micro meter in view of final measurement accuracy, and finally practical resolution of approximately 1 micro meter if the electronic circuit is assumed to be used without costing up severely. It is therefore difficult to provide a further accurate optical grating.

In contrast, with the spread of a photoelectric type encoder, it is increasingly required to generate a detection signal at high resolution and with high accuracy.

To further improve the resolution of such a photoelectric type encoder, a grating interference type displacement meter has been proposed, in which fine pitch (typically about 1 micro meter) graduations are formed on a scale by holography and used as a diffraction grating to positively produce diffraction thereon for obtaining a detection signal.

Figure 10:
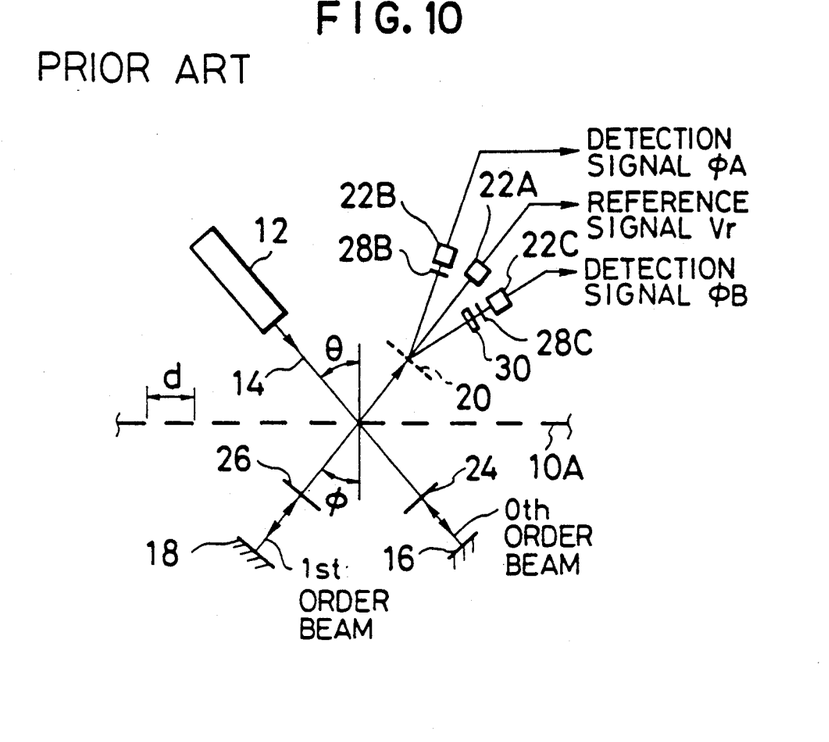
FIG. 10 is a front view illustrating the construction of an illustrative conventional grating interference type displacement meter.

Referring to FIG. 10, a conventional grating interference type displacement meter as disclosed in Japanese Laid-Open Publication No. 47-10034 is illustrated. The grating-interference type displacement meter includes a scale, on which a diffraction grating 10A of a pitch d has been formed, a He - Ne laser light source 12 for emitting a laser beam 14 of a wavelength $\lambda$ as an optical flux to irradiate the diffraction grating 10A therewith, mirrors 16, 18 for reflecting zeroth-and first-order diffracted optical beams produced by the diffraction grating 10A, respectively, a beam splitter (coarse diffraction grating) 20 for splitting into three equal optical beams a combined beam of a zeroth-order beam of the first order optical beam reflected by the first order side mirror 18 and a first-order beam of the zeroth order optical beam reflected by the zeroth-order side mirror 16, and optical detector elements 22A, 22B and 22C for photoelectrically converting the combined beam splitted by the beam splitter 20, respectively. Herein, the respective elements described above except for the scale constitute an optical detector.

In FIG. 10, polarizers 24, 26 which are inserted into optical paths of the zeroth and first-order optical beams, respectively, have directions of polarizations thereof intersecting perpendicularly to each other, and hence no interference fringe is formed on and around the optical detector 22A which is to receive the central one among the aforementioned three optical beams which are yielded as described above by splitting the combined optical beam into the aforementioned three optical beams. Therefore, a simple additive sum signal, not an interference fringe, is incident upon the optical detector element 22A. The signal is here used as a reference signal Vr.

Additionally, an analyzer 28B, which serves to produce an interference fringe, is disposed just before the optical detector element 22B, which then generates a phase A detection signal $\phi A$ which would be produced owing the interference fringe.

Further, a quarter wave plate 30 and an analyzer 28C are disposed just before the optical detector element 22C, which then generates a phase B detection signal $\phi B$ different in its phase by 90° from the phase A detection signal $\phi A$.

An incident angle $\theta$ of the laser beam 14 and a diffraction angle $\phi$ of the first order beam satisfy a relationship:

$$d(\sin \theta + \sin \phi) = \lambda \tag{1}$$

In such a grating interference type displacement meter, an optical grating of an 1 micro meter pitch or less can be achieved by manufacturing the diffraction grating 10A by holography for example, thereby assuring resolution of 0.01 micro meter.

Figure 11:
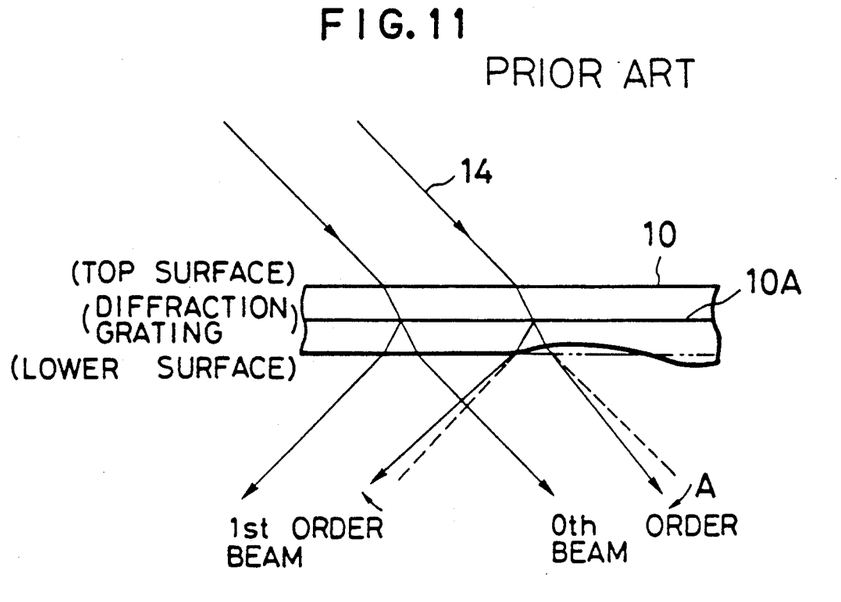
FIG. 11 is a sectional view illustrating a situation in the conventional example wherein optical beams are deflected owing to the bad flatness of a scale.

However, when the glass surface of the scale 10 including the diffraction grating 10A formed thereon has bad flatness, in the transmission type grating interference type displacement meter as shown in FIG. 10, for example, angles of refraction of the zeroth-and first-order beams are changed and hence those optical beams are deflected as indicated by the arrow A in FIG. 11 (when the flatness of the lower surface of the scale is bad). As a result, directions of propagation of the two optical beams incident upon the optical detector elements 22B, 22C and inclined each other, and wave surfaces of the beams intersecting perpendicularly to these directions exhibit a pattern synthesized into a fringe shape, preventing a uniform interference pattern from being produced between the beams over the whole surface across a cross section on which the beams are superimposed. Accordingly, in such a transmission type grating interference type displacement meter, the flatness of the scale must be kept 5 micro meter/100 mm or less, and further no signal might be detected if the directions of optical axes would be inclined owing to any other factor.

On the contrary, in a reflection type grating interference type displacement meter in which a light source and a detector system are disposed together on one side of a reflection type scale, the light source and the detector system may be disposed on the one side of the scale, so that the reflection type one is suitable for a built-in type scale such as a separate type one. In such a reflection type grating interference type displacement meter, however, diffraction of a reflected light is used, so that displacement of an optical path originating from any inclination of the scale and insufficient flatness of the same is severer than the aforementioned transmission type is, requiring more accurate mounting and adjusting operations, which are difficult in execution.

SUMMARY OF THE INVENTION

In view of the drawbacks of the conventional displacement meters, it is an object of the present invention to provide a grating interference type displacement meter apparatus capable of assuring a stable signal and hence simplifying an alignment needed to mount a detector system by reducing influences due to variations, fine in the magnitude but severe in the influences, resulting from the bad flatness of a scale surface and from pitching (inclination) of the same.

In accordance with one aspect of the present invention, a grating interference type displacement meter apparatus comprises a scale including a diffraction grating formed thereon and a detector composed of a light source for irradiating said diffraction grating with an optical beam emitted therefrom and of an optical detector element for photoelectrically converting a combined beam of a plurality of optical beams produced by said diffraction grating, said detector means generating a periodically-changing detection signal responsibly to a relative displacement thereof with respect to said scale, said apparatus further comprising means for collimating a plurality of the optical beams produced by said diffraction grating before they are combined.

In accordance with the present invention, said means for collimating a plurality of the optical beams produced by said diffraction grating can be a convex lens having the focal point located on a refraction plane or a diffraction plane of said scale.

In accordance with the present invention, said means for collimating a plurality of the optical beams produced by said diffraction grating can be a concave mirror.

In accordance with another aspect of the present invention, a grating interference type displacement meter apparatus like above, further comprises an optical element for splitting the optical beam emitted from said light source such that splitted optical beams enter said diffration grating and a plurality of reflector means for reflecting back respective zeroth-order beams transmitted through said diffraction grating in the same direction respectively, such that those zeroth-order beams reenter said diffraction grating, whereby first-order diffracted beams, which have been produced through said diffraction grating from the zeroth-order reflected beams reentering the diffraction grating from a plurality of said reflector means, are combined.

In the conventional techniques, if a refraction angle (in the transmission type) and a diffraction angle (in the reflection type) would be changed owing to the bad flatness of a scale surface and to any inclination of the scale, two optical beams incident upon the optical detector elements 22B, 22C propagate differently at a certain angle, and hence wave front surfaces intersecting perpendicularly to their directions of propagation are synthesized forming a undesirable fringe pattern, thereby making it impossible to assure uniform interference between the optical beams over the entire surface, in cross section, of superposition of the optical beams. This leads to difficulties that the accuracy of the flatness of the scale must be kept at a high level, and that occurrence of additional inclination between the relative directions of propagation of the optical beams due to any other factor makes it impossible to detect a signal, resulting in any measurement error.

Figure 2:
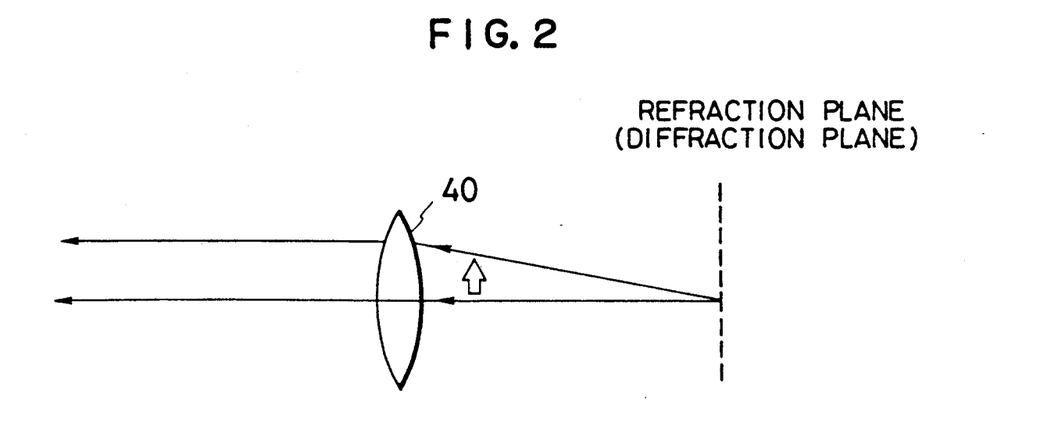
FIG. 2 is a view illustrating an optical path for description of the operation of the first preferred embodiment.

In accordance with a first preferred embodiment of the present invention, as illustrated in FIG. 2, a convex lens 40 is disposed such that its focal point is located on the refraction plane or the diffraction plane of the scale, so that a plurality of optical beams produced by the diffraction grating propagate in parallel to the directions of propagation thereof defined in the design of the apparatus, prior to their combination by a half mirror 50. This enables a stable interference signal to be constructed even when the flatness of the scale is of 15 micro meter/100 mm or more. Additionally, even when the optical axes of the optical beams incident upon the optical detector elements are inclined to each other, owing to any other factor, a stable detection signal can be assured. Herein, a convex mirror may also be available to realize the just-mentioned conditions.

Then, irrespective of the bad flatness of the scale surface and pitching due to variations of alignment upon mounting the scale, the optical beams after transmission through the lens can propagate in parallel to the optical axis as designed to the optical axis as designed at all times. In other words, the optical beams advance along parallel optical beams after transmission through or reflection on the half mirror 50, enabling stable interference to be kept. By making the optical system stable as described above, the affections of the uneven flatness of the scale surface and the pitching can be reduced, thereby assuring a more stable detection signal. Therefore, allowable extents of the flatness of the scale and the alignment upon the mounting of the scale can be improved, allowing the use of an inexpensive scale and simple alignment. Additionally, there is required no severe design of the shape and parallel transmission of the optical beam from the light source.

Particularly, in the reflection type grating interference type displacement meter, in which displacement of the optical path caused by any inclination of the scale, etc., is severer than in the transmission type and critical mounting and adjustment are required, the mounting and adjustment of the scale are more effectually facilitated, and a reflection type grating interference type displacement meter with use of a small-sized light source such as a laser diode for example can be realized.

Here, as illustrated in FIG. 11, the zeroth order optical beam transmitted by the scale 10 is also influenced by the flatness of the scale as the first order beam diffracted by the diffraction grating 10A, and in view of diffraction efficiency the amount of the zeroth order optical beam (about 80%) is very larger than that of the first order one (about 20%).

Figure 8:
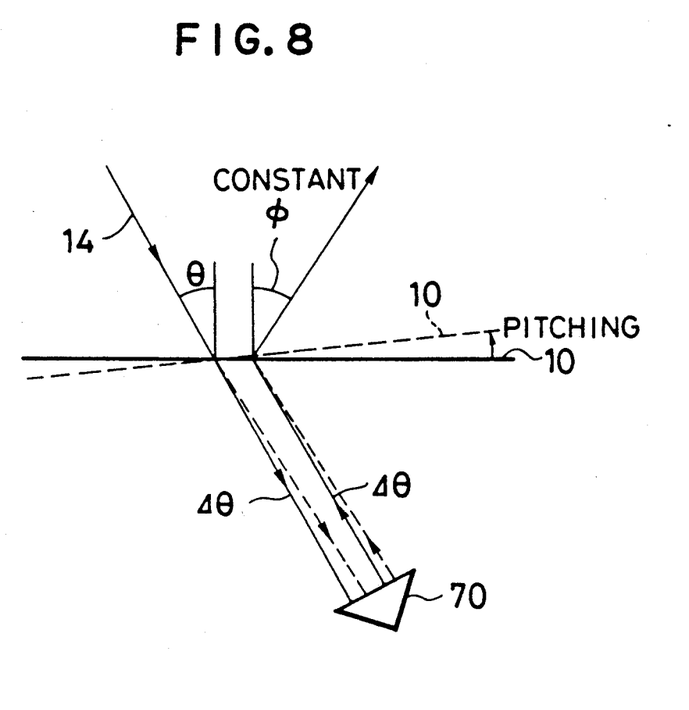
FIG. 8 is a view illustrating an optical path for description of the operation of the fifth preferred embodiment.

In accordance with a second preferred embodiment of the present invention, which has been contemplated in view of the just-mentioned aspect of the displacement meter, as illustrated in FIG. 8, the zeroth order optical beams transmitted by the diffraction grating (10) are reflected back in the same direction by a rectangular prism 40 or a triangular prism such as, a corner cube, a cats eye and the like, and are reincident upon the diffraction grating, whereby a plurality of the optical beams produced by the diffraction grating are allowed to propagate parallely to directions of propagation thereof set upon the design of the device.

Then, irrespective of the bad flatness of the scale and the pitching, the optical beams after the diffraction are allowed to propagate in the same direction at all times. The second preferred embodiment also assures a stable reference signal even when the flatness of the scale exceeds 15 micro meter/100 mm, as the first preferred embodiment.

Additionally, when the optical beam emitted from a light source is set so as not to go back to the light source, even if the light source is of such a type as a laser diode wherein it is affected by a returned light, oscillation of the light source is stabilized and hence associated noise can be reduced.

Herein, it is also possible in the prior example shown in FIG. 10 to replace the mirrors 16 and 18 by a rectangular prism for example. In this occasion, however, since the optical beam reflected on the mirror 18 is a first order diffracted one with the amount reduced to about 20% of that of the optical beam emanating from the light source. Accordingly, the amount of a further first order diffracted beam yielded by further diffracting the original first order diffracted beam is reduced to about 4% of that of the optical beam from the light source. This requires a further sensitive optical detector as well as a light source of greater capacity. Against this, since the present invention is adapted to reflect the zeroth order optical beam the amount of the zeroth-first diffracted beam can approach about 16% of the amount of the beam from the light source, thereby improving the response speed of the optical detector as well as miniaturizing the light source.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

In the following, preferred embodiments of the present invention will be described with reference to the accompanying drawings.

Figure 1:
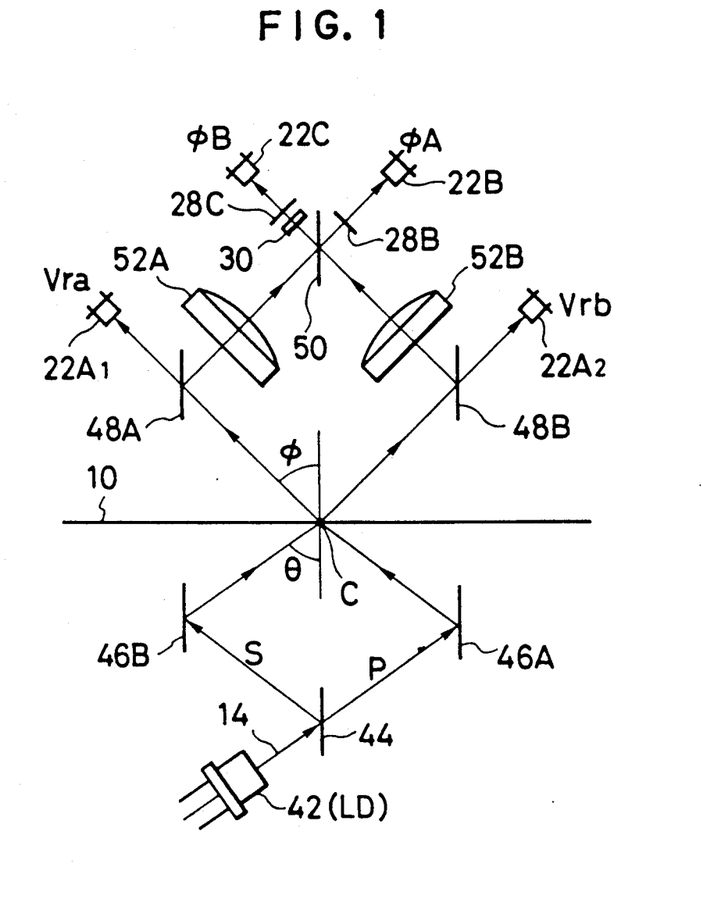
FIG. 1 is a front view illustrating the construction of a first preferred embodiment of a grating interference type displacement meter apparatus according to the present invention.

FIG. 1 illustrates a first preferred embodiment of the present invention. In the first embodiment, a transmission type grating interference type displacement meter includes, as in the aforementioned conventional case, a transmission type scale 10 having a diffraction grating formed thereon, a laser diode (LD) 42 as a light source for emitting a collimated parallel optical beam, and a detector composed of optical detector elements $22A_1$, $22A_2$, 22B and 22C each formed of PIN photodiodes for example, of analyzers 28B, 28C, and of a quarter wave plate 30, whereby a periodically-changing detection signal is generated responsibly to a relative displacement between the scale 10 and the detector, the displacement meter further including a P/S splitter 44 for halving the laser beam 14 emitted from the laser diode 42 conformably to a direction of polarization of the laser beam 14, a pair of mirrors 46A, 46B for directing optical beams so halved to the diffraction grating formed on the scale 10 such that they are symmetrically incident upon the grating at the same diffraction point C and at the same incident angle $\theta$, beam splitters 48A, 48B provided to reflect and separate only first order diffracted optical beams respectively, the optical detector elements $22A_1$, $22A_2$ for photoelectrically converting the diffracted optical beams separated by the beam splitters 48A, 48B to yield a reference signal $Vr = (Vra + Vrb)/2$, a half mirror 50 for recombining the diffracted beams reflected on the beam splitters 48A, 48B, and convex lenses 52A, 52B each disposed between the half mirror 50 and the beam splitters 48A, 48B and each having a focal point thereof at a refraction point of the scale 10.

With such a construction, the two optical beams diffracted by the diffraction grating are transmitted through the convex lenses 52A, 52B prior to the recombination thereof by the half mirror 50, whereby bent optical axes, which might be caused by small, but transversely antisymmetric variations such as insufficient flatness of a scale surface and pitching of the scale, can be corrected without being severely affected by those variations.

In the present embodiment, there has been adopted a transversely symmetrical construction, the so-called multi-stage one wherein the diffracted beams are recombined by the half mirror 50 after once reflected upon the beam splitters 48A, 48B. Accordingly, the diffracted beams enter the optical detector elements 22B, 22C at a substantially predetermined incident angle because of the first order diffracted beams having a common diffraction angle $\phi$, even when the wavelength $\lambda$ of the emitted beam from the laser diode 42 is varied. Thus, there are also moderated large, but symmetrical variations such as variations of the wavelength of the light source and variations of rolling on the scale and of any gap in the scale, so that the diffracted beams are not affected by such variations. Additionally, there is no fear of any reflected light on the scale 10 surface being directly incident on the optical detector element.

Although in the present embodiment, the convex lenses 52A, 52B were disposed between the beam splitters 48A, 48B and the half mirror 50, they may be disposed without limitation to the above situation between the scale 10 and the beam splitters 48A, 48B. They may be disposed at any position provided there would be satisfied conditions that the position is located on this side of the recombination of the optical beams diffracted by the diffraction grating and their focal points are placed on the reflection plane of the scale.

In succession, a second preferred embodiment of the present invention will be described with reference to FIG. 3.

Figure 3:
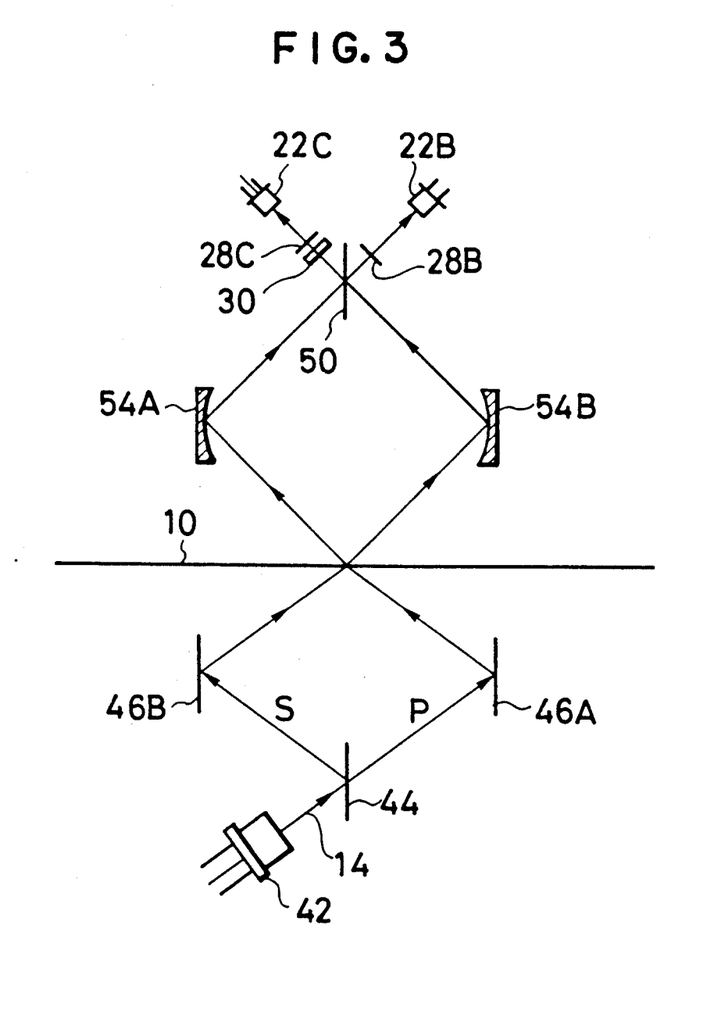
FIG. 3 is a front view illustrating the construction of a second preferred embodiment of the present invention.

In the second embodiment, a transmission type grating-interference type displacement meter of the same multi-stage type as in the first embodiment is disclosed, wherein as illustrated in FIG. 3, concave mirrors 54A, 54B are disposed instead of the convex lenses 52A, 52B at positions of the beam splitters 48A, 48B.

Herein, in the second embodiment, a reference signal Vr should be prepared separately using a beam splitter (not shown), etc., disposed at any other position.

Figure 4:
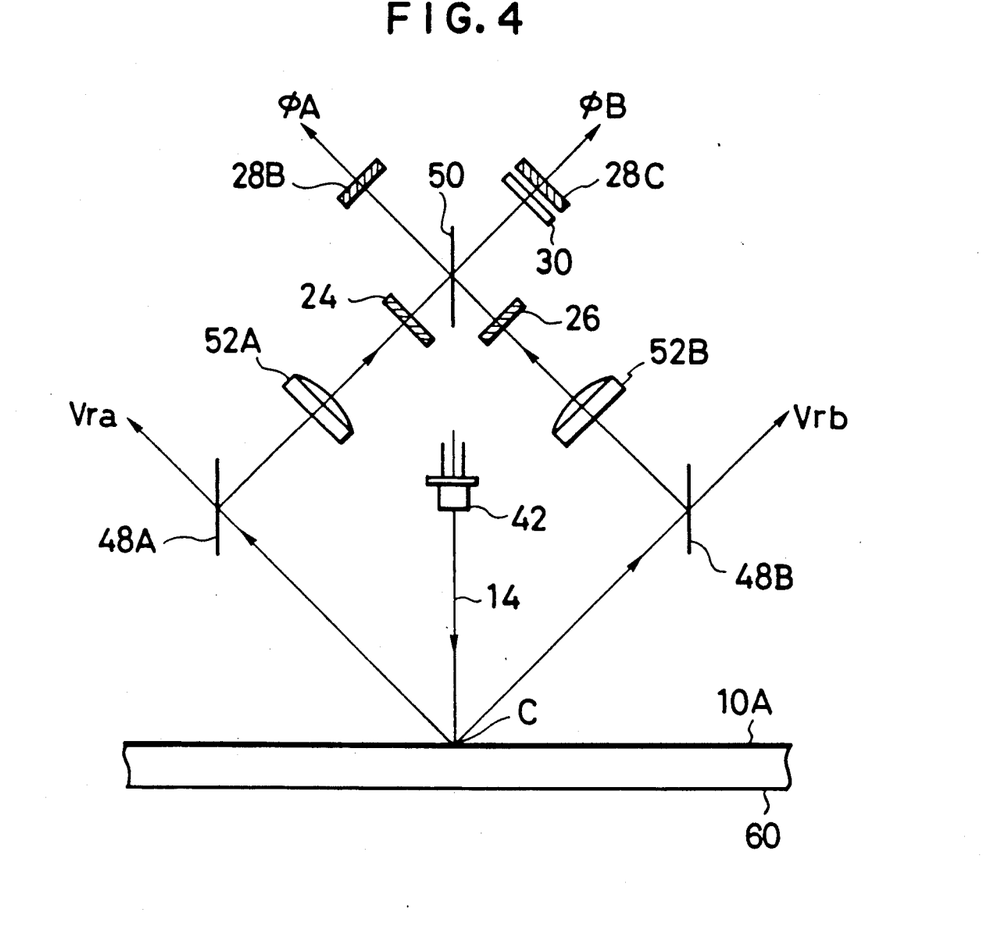
FIG. 4 is a front view illustrating the construction of a third preferred embodiment of the present invention.

Although in the first and second embodiments the present invention was applied to the transmission type grating-interference type displacement meter incorporating the transmission type scale 10, it may also be applicable to a reflection type grating-interference displacement meter incorporating a reflection type scale 60 as illustrated in FIG. 4 for example without limitation to the above illustrative example.

In the following, third and fourth preferred embodiments of the present invention, which are applied to the reflection type grating-interfence displacement meter, will be described.

In the third embodiment, a reflection type grating-interference type displacement meter is disclosed as illustrated in FIG. 4, wherein the convex lenses 52A, 52B are disposed between the beam splitters 48A, 48B and the polarizing plates 24, 26 such that their focal points are located at the diffraction point C of the scale 60.

Figure 5:
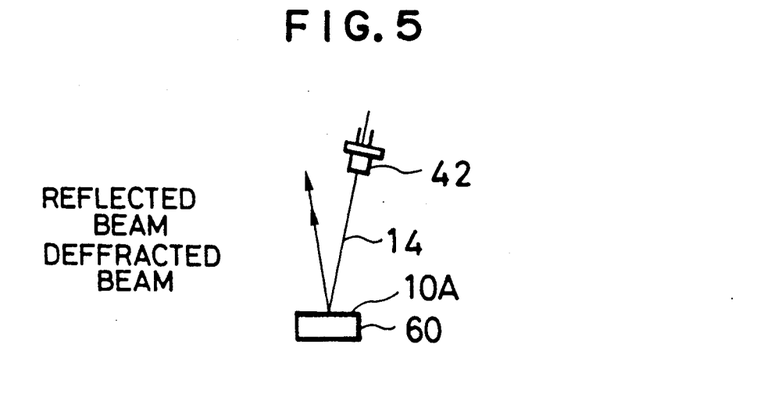
FIG. 5 is a side view illustrating the same.

Additionally, the optical beam 14 emitted from the laser diode 42 as the light source is slantingly incident on the scale 60 as illustrated in FIG. 5, so that a reflected beam on the scale 60 is prevented from being transmitted back to the laser diode 42 and hence automatic power control (APC) of the laser diode 42 is protected from being disturbed owing to such a back light.

Since also in the present embodiment, the optical system is transversely symmetrical, it is resistant to variations of the symmetrical optical path such as variations of the wavelength of the emitted beam from the light source and is capable of moderating the affection of such variations of the wavelength of the emitted beam from the laser diode 42.

Other factors are identical to those of the first embodiment, and hence the description will be omitted.

Figure 6:
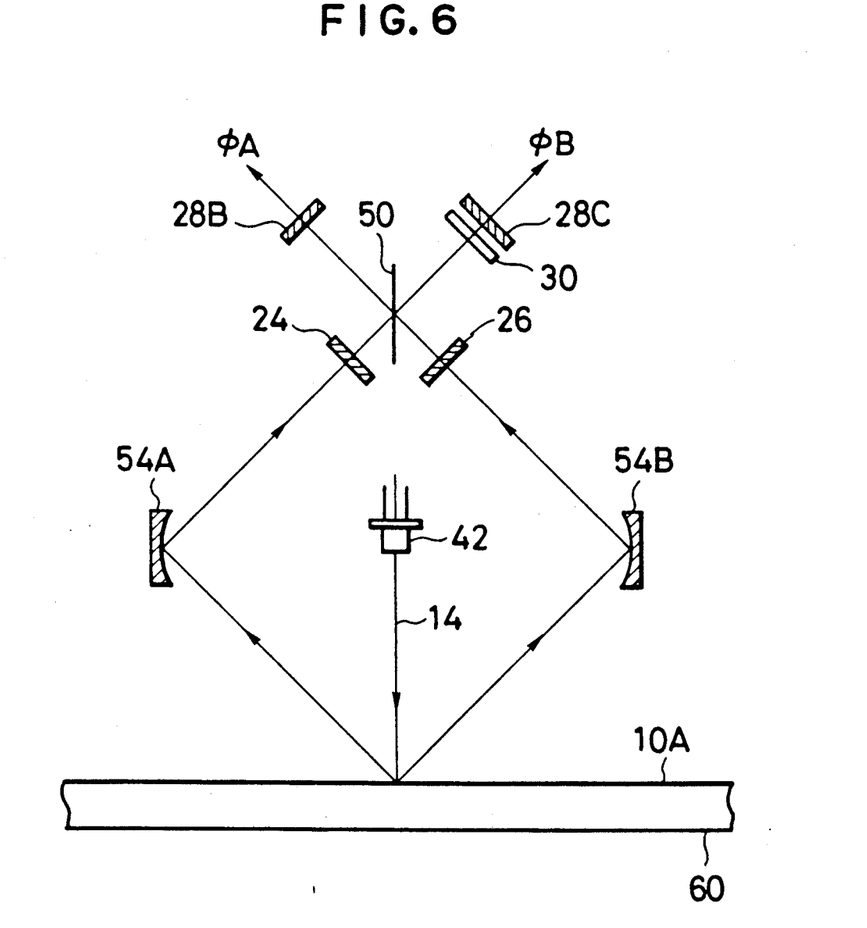
FIG. 6 is a front view illustrating the construction of a fourth preferred embodiment of the present invention.

Successively, the fourth embodiment of the present invention will be described with reference to FIG. 6.

In the fourth embodiment, the same reflection type grating-interference type displacement meter as that in the third embodiment is disclosed, wherein the concave mirrors 54A, 54B are disposed instead of the convex lenses 52A, 52B at the positions of the beam splitters 48A, 48B.

Other factors are identical to those of the third or second embodiment and hence the description will be omitted.

In succession, a fifth preferred embodiment of the present invention will be described with reference to FIG. 7.

Figure 7:
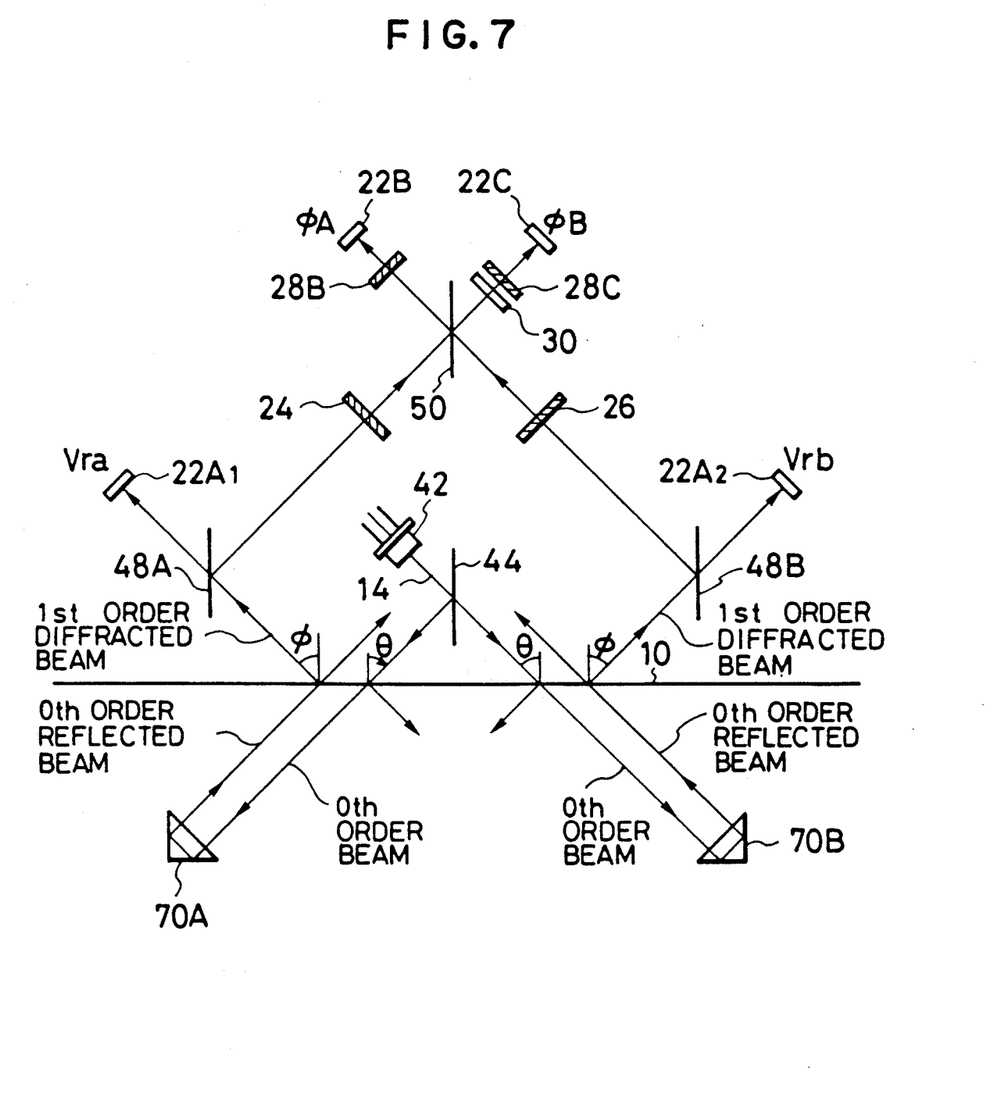
FIG. 7 is a front view illustrating the construction of a fifth preferred embodiment of the present invention.

In the present embodiment, as illustrated in FIG. 7, a transmission type grating-interference type displacement meter includes, as in the conventional example, a transmission type scale 10, LD (laser diode) 42, and a detector composed of optical detector elements $22A_1$, $22A_2$, 22B, 22C, polarizing plates 24, 26, analyzers 28B, 28C, and a quarter wave plate 30, further including a beam splitter 44 for halving a laser beam 14 emitted from the laser diode 42 such that it is incident upon a diffraction grating formed on the scale 10, rectangular prisms 70A, 70B each for reflecting back respective zeroth-order beams in the same direction, which are transmitted by the diffraction grating on the scale 10 after entering the scale transversely symmetrically at the same incident angle $\theta$ with respect to the scale 10 (if $\theta$ is set to satisfy $\theta \cong \phi$, $\phi$ is more stable), and directing them such that they reenter the diffraction grating, beam splitters 48A, 48B each for reflecting and separating first-order diffraction beams which have been formed through the diffraction grating from the zeroth-order reflected beams reflected on the rectangular prisms 70A, 70B and allowed to reenter the diffraction grating, the optical detector elements $22A_1$, $22A_2$ for photoelectrically converting the diffracted beams separated by the beam splitters 48A, 48B to yield a reference signal $Vr = (Vra + Vrb)/2$, and a half mirror 50 for recombining the diffracted beams reflected on the beam splitters 48A, 48B.

With such a construction, the respective zeroth-order beams transmitted by the diffraction grating are reflected back in the same direction by the rectangular prisms 70A, 70B, for reentrance onto the diffraction grating. Therefore, as illustrated in FIG. 8, the optical beams, which have been differently refracted by the scale 10 owing to the bad flatness of the same after entering the same, reenter the same at the same incident angle, so that affections of the refraction on the beams are compensated to make equal at all times the diffraction angles $\phi$ of the two right and left beams. This assures the first-order diffracted beams propagating in the same direction at all times and hence a stable interference signal whatever the flatness of the scale surface is or whatever scale pitching due to an unsatisfactory alignment of the scale is.

Figure 9:
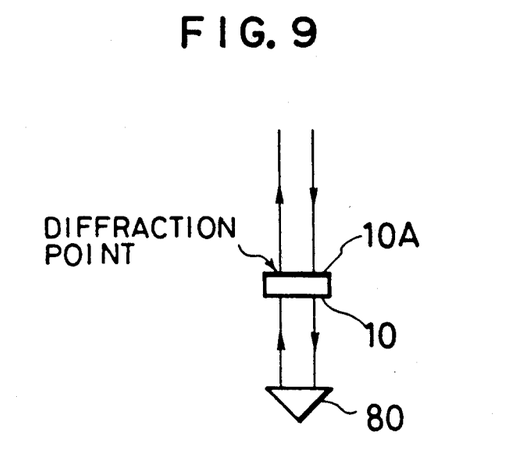
FIG. 9 is a side view illustrating a portion of a modified example of the fifth preferred embodiment.

Although in the present embodiment, the rectangular prisms were available as the means for reflecting back the zeroth-order beams transmitted by the diffraction grating, triangular prisms 80 such as corner-cube prisms and cats eyes, etc., may instead be incorporated. In this occasion, the diffraction point may transversely shifted in the vertical direction with respect to the space of FIG. 7, as illustrated in FIG. 9.

Furthermore, although in the above-mentioned embodiments the laser diode 42 was employed as a light source, the kinds of the light source are not limited thereto.

Although certain preferred embodiments have been shown and described, it should be understood that many changes and modifications may be made therein without departing from the scope of the appended claims.

What is claimed is:

1. A grating-interference type displacement meter apparatus, comprising:
   a scale including a diffraction grating formed thereon;
   a detector composed of a light source for irradiating said diffraction grating with an optical beam emitted therefrom and of an optical detector element for photoelectrically converting a combined beam of a plurality of optical beams produced by said diffraction grating, said detector generating a periodically-changing detection signal responsibly to a relative displacement thereof with respect to said scale; and
   means for collimating a plurality of the optical beams produced by said diffraction grating prior to said combination of said optical beams.

2. A grating-interference type displacement meter apparatus according to the claim 1 wherein said means for collimating a plurality of the optical beams is a convex lens disposed such that a focal point thereof is located on the refraction plane or diffraction plane of the scale.

3. A grating-interference type displacement meter apparatus according to the claim 1 wherein a plurality of the optical beams produced by said diffraction grating are reflected on a pair of optical elements and then recombined by a common half mirror.

4. A grating-interference type displacement meter apparatus according to the claim 3 wherein said optical elements comprise a plurality of beam splitters, and at least any one of a plurality of the optical beams splitted by those beam splitters is detected to yield a reference signal.

5. A grating-interference type displacement meter apparatus according to the claim 3 wherein said optical elements comprise a plurality of concave mirrors, by which a plurality of said optical beams are collimated each other.

6. A grating-interference type displacement meter apparatus according to the claim 1 wherein said means for collimating a plurality of the optical beams is a concave mirror.

7. A grating-interference type displacement meter apparatus according to the claim 1 wherein said scale is of a reflection type and the optical beam from said light source is slantingly incident upon the scale.

8. A grating-interference type displacement meter apparatus, comprising:
 a scale including a diffraction grating formed thereon;
 a detector composed of a light source for irradiating said diffraction grating with an optical beam emitted therefrom and of an optical detector element for photoelectrically converting a combined beam of a plurality of optical beams produced by said diffraction grating, said detector generating a periodically-changing detection signal responsibly to a relative displacement thereof with respect to said scale;
 an optical element for splitting the optical beam emitted from said light source such that splitted optical beams enter said diffraction grating; and
 a plurality of reflector means for reflecting back respective zeroth-order beams transmitted through said diffraction grating in the same direction respectively, such that those zeroth-order beams reenter said diffraction grating,
 whereby first-order diffracted beams, which have been produced through said diffraction grating from the zeroth-order reflected beams reentering the diffraction grating from a plurality of said reflector means, are recombined.

9. A grating-interference type displacement meter apparatus according to the claim 8 wherein an incident angle $\theta$ with respect to said scale, of a plurality of the optical beams splitted by said optical element is substantially equal to a diffraction angle $\phi$ by the scale, of the beams reflected by said reflector means to reenter the scale after being transmitted through the scale.

10. A grating-interference type displacement meter apparatus according to the claim 8 wherein a plurality of triangular prisms are used as a plurality of said reflector means to shift the diffraction point transversely across said scale.

* * * * *